United States Patent [19]

Nourry et al.

[11] Patent Number: 5,029,789
[45] Date of Patent: Jul. 9, 1991

[54] TOP HAT RAIL FOR FIXING SNAP-FIT APPARATUS

[75] Inventors: Daniel Nourry, Dijon; Jean P. Thierry, Couternon, both of France

[73] Assignee: Telemecanique, France

[21] Appl. No.: 517,877

[22] Filed: May 2, 1990

[30] Foreign Application Priority Data

May 3, 1989 [FR] France .................. 89 06151

[51] Int. Cl.⁵ .............................. A47B 96/06
[52] U.S. Cl. .................. 248/225.1; 361/363; 361/376
[58] Field of Search .......... 248/225.1, 222.2; 361/379, 363, 371, 376, 354; 200/304; 174/138 G

[56] References Cited

U.S. PATENT DOCUMENTS

| | | | |
|---|---|---|---|
| 3,218,520 | 11/1965 | Casey | 361/363 |
| 3,337,172 | 8/1967 | Jackson | 248/222.2 |
| 4,552,272 | 11/1985 | Field | 248/222.2 X |
| 4,672,508 | 6/1987 | Bridges | 248/225.1 X |
| 4,909,464 | 3/1990 | Levine | 248/225.1 |
| 4,912,598 | 3/1990 | Grass | 361/379 X |
| 4,937,704 | 6/1990 | Link | 361/354 |

FOREIGN PATENT DOCUMENTS

| | | | |
|---|---|---|---|
| 2510815 | 9/1976 | Fed. Rep. of Germany | 361/376 |
| 2810071 | 9/1979 | Fed. Rep. of Germany | 361/376 |
| 3544363 | 6/1987 | Fed. Rep. of Germany | 361/376 |

*Primary Examiner*—J. Franklin Foss
*Attorney, Agent, or Firm*—William A. Drucker

[57] ABSTRACT

A top hat rail is disclosed for fixing snap-fit apparatus, formed by shaping in the form of an omega a metal strip of predetermined thickness and having a web and two flanges. The flanges of said rail are deformed towards their free ends so that the edge of the flanges has, for the apparatus to be snap-fitted, a useful fictitious thickness, this thickness being determined between two support zones situated on each side of the flange. The fictitious thickness is equal to the thickness of a standardized rail and substantially greater than the real thickness.

4 Claims, 1 Drawing Sheet

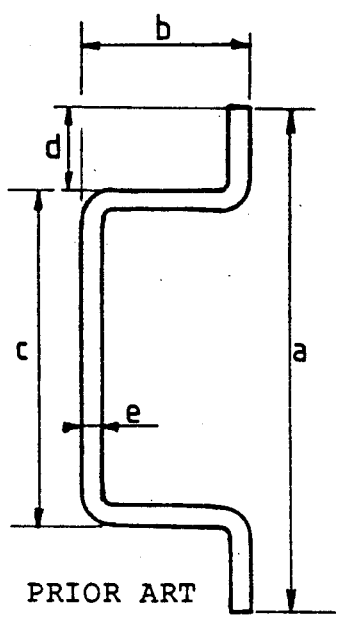
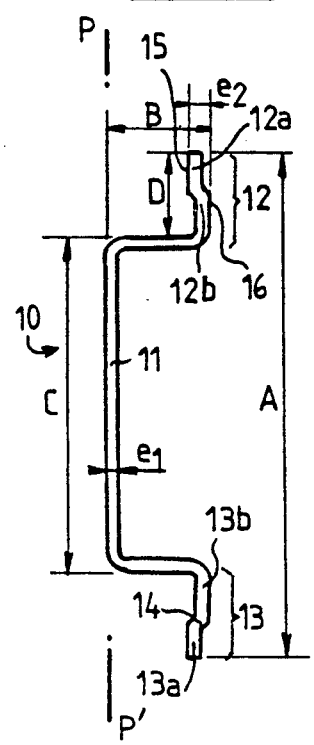
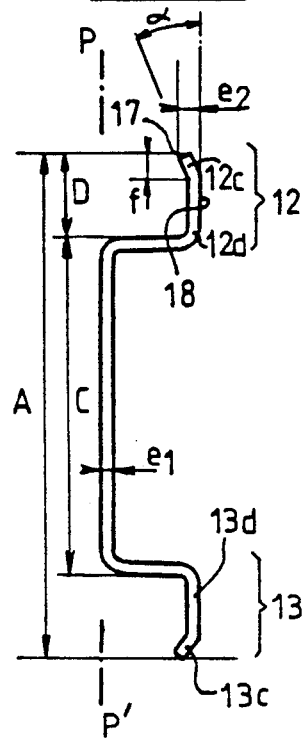
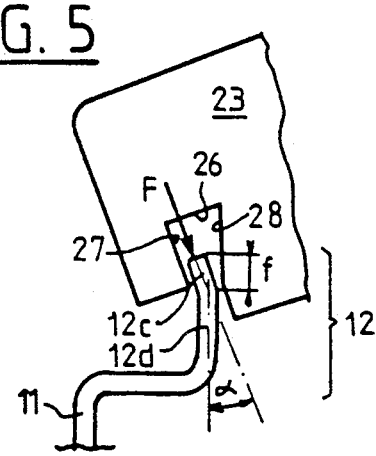
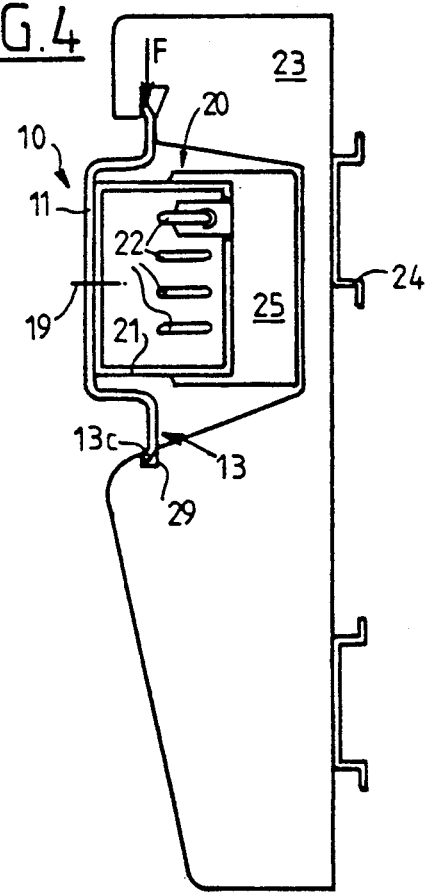
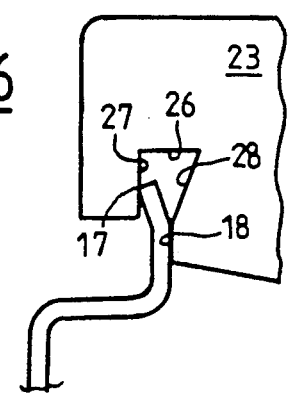

TOP HAT RAIL FOR FIXING SNAP-FIT APPARATUS

BACKGROUND OF THE INVENTION

The present invention relates to a lightened top hat rail for fixing and carrying snap-fit apparatus.

The extruded rails supporting snap-fit apparatus are governed by standards, particularly European standards, namely the standard EN 50 022 for top hat rails 35 mm wide and standard EN 50 023 for rails 75 mm wide.

Such top hat rails are generally used for supporting electric apparatus; the rear faces or bases of the apparatus have appropriate elements for snap-fitting on the edges of the flanges of the rails.

In particular, the top hat rails defined by standard EN 50 023 are suitable for fixing and supporting relatively heavy apparatus, but they have the drawback of themselves being heavy and difficult to bore, for they are necessarily obtained by bending 3 mm thick metal sheet.

In some cases, it may be desirable to use lighter top hat rails than those defined by the above standards, but still capable of supporting apparatus, plates or bases having the specific snap-fit elements of the rails defined by these standards.

SUMMARY OF THE INVENTION

The purpose of the invention is to make top hat rails lighter and easier to bore than standardized rails, by making it possible for them to receive apparatus, plates or bases which can also be snap-fitted on standard rails of the same width.

According to the invention, the top hat rail for fixing snap-fit apparatus is made by bending, in the form of an omega, a metal strip of predetermined thickness $e_1$, the flanges of the rail being deformed close to their free end so that their edge has a fictitious useful thickness $e_2$ between two support zones provided for the apparatus to be snap-fitted and situated on both sides of the flanges, the fictitious thickness $e_2$ is that provided for a standard rail of the same thickness and it is substantially greater than the real thickness $e_1$.

Thus, for example, it is possible to form a rail of a width of 75 mm whose fictitious thickness $e_1$ of the flange edges is 3 mm, as defined in the European standard EN 50 023, by bending a steel sheet whose thickness is substantially less than 3 mm, for example about 2 mm to 2.5 mm, so as to obtain a lighter, less expensive rail which is easier to bore when it is desired to form orifices for fixing screws. The deformed portions of the flanges of the rail form a preferably offset step, or a slanting flange preferably oriented towards the web of the rail with respect to the portion of the flanges close to the web.

BRIEF DESCRIPTION OF THE DRAWINGS

Other features and advantages of the invention will be well understood from the following description of one embodiment, with reference to the accompanying drawings in which:

FIG. 1 shows in cross section a conventional standardized 75 mm rail;

FIGS. 2 and 3 are similar sections of modifications to a rail according to the invention with a width of 75 mm;

FIG. 4 shows in section the fitting of a plate supporting electric apparatus and a distributor device on the rail of the invention; and FIGS. 5 and 6 illustrate the mounting of an apparatus or a plate on the edge of the rail of the invention.

DESCRIPTION OF THE PREFERRED EMBODIMENTS

The conventional standardized top hat rail shown by way of comparison in FIG. 1, is formed by bending a steel sheet 3 mm thick in the form of an omega. This rail has a width a of 75 mm and a height b of 25 mm. It has a web of width c of 50 mm and two flanges connected to the web and of a width d of 12.5 mm, such that $a = c + 2d$.

The lightened top hat rail 10 according to the invention, illustrated in FIG. 2, has a web 11 and two flanges 12, 13 connected to the web. The rail is obtained by bending a steel sheet of thickness $e_1$ of 2 mm in the form of an omega. The rail has a width A of 75 mm and a height B of 15 mm. Web 11 of the rail has a width C of 50 mm and its flanges 12, 13 have a width D of 12.5 mm, such that $A = C + 2D$. The height B is the same as that of a standardized rail of 35 mm; it is therefore possible to align such a rail with that of the invention for fixing apparatus which will form an assembly of homogeneous appearance and it allows passage under a gullet when fitting on a frame.

The ends 12a, 13a of flanges 12, 13 are deformed by bending so as to form a step 14 which offsets them towards plane P-P' of web 11 with respect to portions 12b, 13b of the flanges which are connected to the web. The ends 12a, 13a are parallel to portions 12b, 13b. Step 14 is defined so as to provide, between two opposite support zones, namely between a face 15 of end 12a, 13a and an opposite face 16 of portion 12b, 13b, a distance $e_2$ of 3 mm which forms for a snap-fit apparatus a fictitious thickness $e_2$ equal to the standardized thickness e of the rail of FIG. 1.

In the variant of FIG. 3, ends 12c, 13c of flanges 12, 13 of the top hat rail are inclined so as to be closer to the plane P-P' of the web with respect to portions 12d, 13d of the flanges which are connected to the web. The slope of the ends and their width f are defined so that the distance $e_2$ between two opposite support zones, namely the edge 17 of end 12c, 13c the closest to plane P-P' and the opposite face 18 of portion 12d, 13d is equal to 3 mm, i.e. here again forms for a snap-fit apparatus a fictitious thickness $e_2$ equal to the standardized thickness e of the rail shown in FIG. 1.

FIG. 4 shows the rail 10 according to the invention combined with a distributor device 20 including an insulating case 21 which houses metal electric distribution bars 22. Case 21 is fixed to the rail by screws with axis 19 passing through holes bored in the web 11 of the rail. A plate 23 supporting electric apparatus is snap-fitted by means of appropriate female shapes on the ends of flanges 12, 13. The plate itself carries rail elements 24, standardized for example to 35 mm, for supporting apparatus which can be connected to bars 22 via connectors such as 25.

FIGS. 5 and 6 show on a larger scale how a plate 23 is mounted on the end 12c of the flange 12 of the rail of FIG. 3. It would be the same for an electric apparatus adapted for fitting on a standardized rail. The plate has a notch 26 whose edges 27, 28 are inclined with respect to each other. This relative inclination is substantially comparable to the slope of the end 12c of flange 12, so as to facilitate engagement of the plate on the top hat rail (FIG. 5). A spring associated with plate 23 exerts a force F on the edge of flange 12. In the snap-fitted position (FIG. 6) obtained after fitting a portion 29 of a plate on the end 13c of the other flange 13, the edges 27, 28 of notch 26 bear respectively on the edge 17 and the face 18 of flange 12. When plate 23 is made from metal, the good contact thus obtained between the plate and the rail produces a satisfactory ground connection.

Of course, the above mentioned dimensions are given within the usual tolerances. The deformed portions of the flanges may advantageously have a width less than or equal to about half the width of the flanges.

What is claimed is:

1. In an assembly of a stationary rail and a removable apparatus having a carrier plate provided with notches and with pressure spring means located within the notches and cooperating with the rail edges, a top hat rail for snap-fit fixing of said carrier plate, said rail being formed by shaping a metal strip of uniform predetermined thickness and having:
   i. A C-shaped web portion having a central rectilinear part of a predetermined width and two outer rectilinear parts respectively extending the respective ends of said central part at right angles to said central part;
   ii. first and second lips, each having first and second rectilinear interconnected parts, the first parts of the respective lips respectively extending said outer parts at right angles thereto, the second parts having inner faces which are contained in a first plane, whereas the first parts have outer faces which are contained in a second plane, said first and second planes being parallel to said central part and the distance between said first and second planes having a predetermined value which equals the standardized thickness of a conventional top hat rail, the central part of which has the said predetermined width.

2. In an assembly of a stationary rail and a removable apparatus having a carrier plate provided with notches and with pressure spring means located within the notches and cooperating with the rail edges, a top hat rail for snap-fit fixing of said carrier plate, said rail being formed by shaping a metal strip of uniform predetermined thickness and having:
   i. A C-shaped web portion having a central rectilinear part of a predetermined width and two outer rectilinear parts respectively extending the respective ends of said central part at right angles to said central part;
   ii. first and second lips, each having first and second rectilinear interconnected parts, the first parts of the respective lips respectively extending said outer parts at right angles thereto, the first parts being parallel to the central part of the web, their outer faces being contained in a first plane, whereas the second parts are inwardly inclined towards said central part and have inner edges which are contained in a second plane, said first and second planes being parallel to said central part and the distance between said first and second planes having a predetermined value which equals the standardized thickness of a conventional top hat rail, the central part of which has the said predetermined width.

3. A top hat rail as claimed in claim 1, wherein said second parts of the lips have a width not exceeding half the width of said lips.

4. A top hat rail as claimed in claim 2, wherein said second parts of the lips have a width not exceeding half the width of said lips.

* * * * *